United States Patent
Conklen et al.

[11] Patent Number: 5,828,582
[45] Date of Patent: Oct. 27, 1998

[54] AUTOMATIC CONTROL OF ENDOTHERMIC GAS GENERATORS USING LOW COST OXYGEN SENSING PROBES

[75] Inventors: Randall R. Conklen, New Holland; Gary D. Keil, Elmwood; Paul R. Luebbers, Peoria, all of Ill.

[73] Assignee: Caterpillar Inc., Peoria, Ill.

[21] Appl. No.: 824,108

[22] Filed: Mar. 25, 1997

[51] Int. Cl.[6] .............................. G01N 27/26; G05D 7/00
[52] U.S. Cl. .............................. 364/528.09; 364/528.01
[58] Field of Search ..................................... 364/500, 505, 364/557, 528.09, 528.01; 204/424–429; 432/18, 36; 110/185, 186, 190; 165/201; 73/23.31, 863.71

[56] References Cited

U.S. PATENT DOCUMENTS

4,060,807  11/1977  Barton ................................. 343/17.1 R
4,147,513  4/1979  Bienkowski et al. ..................... 23/232
5,211,820  5/1993  Poor et al. ......................... 204/153.18

*Primary Examiner*—Melanie Kemper
*Attorney, Agent, or Firm*—R. Carl Wilbur

[57] ABSTRACT

A control system for a gas generator is disclosed. The control system includes an automotive type oxygen sensor that produces a signal responsive to the oxygen content of a product gas. The automotive type oxygen sensor is connected to a controller and is installed in the gas generator so that the sensor tip is in the product gas, downstream of a first heat exchanger. Preferably, the installation of the automotive sensor is at a point where the product gas has been cooled to at least 1500° F. at a rate of at least 4000° F. The controller produces an output signal responsive to the oxygen sensor signal. A trim valve receives the controller output signal and responsively varies an input gas to vary the composition of the product gas.

15 Claims, 4 Drawing Sheets

AUTOMATIC CONTROL OF ENDOTHERMIC GAS GENERATORS USING LOW COST OXYGEN SENSING PROBES

TECHNICAL FIELD OF THE INVENTION

The present invention relates to gas generation, and more specifically to the automatic control of a gas generator using low cost oxygen sensing probes.

BACKGROUND OF THE INVENTION

Endothermic gas is widely used as a protective atmosphere for the heat treatment of various metals and is also used as a carrier gas for carburizing. Most commonly, endothermic gas is prepared by reacting hydrocarbon gas and air in a reaction retort containing a catalyst at elevated temperature and is defined by the American Society for Metals as a series of atmospheres designated as a Class 300 carrier gases having a nominal composition of 40% nitrogen, 40% hydrogen, and 20% carbon monoxide. A typical analysis would be as follows:

40.4% $H_2$
19.9% CO
39.0% $N_2$
0–0.4% $CH_4$
0.1–0.4% $H_2O$
0.1–0.5% $CO_2$

The catalyst typically comprises nickel impregnated upon an aluminum oxide or insulating firebrick (IFB) clumps. Typically, the temperature of the catalyst bed is held at 1800°–2200° F. The process of generating endothermic gas in this way is known in the art. For example, one patent describing certain aspects of such generation is U.S. Pat. No. 4,805,881 issued to Schultz.

In practice, one or more endothermic gas generators may be connected together to supply gas through a header system to one or more furnaces. The total amount of endothermic gas needed to supply the header system can vary depending on how many furnaces are operating, or on the particular stage each furnace is at in the cycle it is running. Some furnaces operate with a steady state flow all of the time, whereas others may have varying flow requirements during their operation; for example, high flows may be required following door openings to provide purging of vestibules. This change in header demand results in flow changes of the air and hydrocarbon gas entering the endothermic gas generator and provides the need for controlling the hydrocarbon gas to air ratio.

It is well known that the composition of the endothermic gas is determined not only by the ratio of the input gas to air, but also by the composition of the input gas and air. Composition of the air can vary depending on the amount of water vapor in the air. Composition of the input gas can vary also. The most common reaction gas used in endothermic gas generators is natural gas, which is known to have varying amounts of methane, ethane, propane, butane, pentane, oxygen, nitrogen, and other hydrocarbons. Natural gas also contains small amounts of oil vapor which is carried by the gas from the oil fields. This oil can often be seen as an oily coating on the interior surfaces of natural gas piping upon examination after some time in service. Often, it will accumulate in drip legs provided on natural gas piping. Often in the winter when a cold front arrives, it is very common for multiple endothermic gas generators in a bank connected to a common natural gas supply header to all experience a severe change in endothermic gas composition at essentially the same time. This is attributed to oil vapor movement caused by the increased natural gas flows as large numbers of building heaters are activated. In some regions, gas supplies are supplemented with propane or propane/air mixtures as a means of peak shaving during the winter. In any case, composition changes within the reaction gas or air is yet a further factor affecting the composition of the product endothermic gas.

Endothermic gas is controlled to a specific richness level by variation of the input reaction gas to air ratio. The specific richness of the gas is related by known formulas to the amount of residual carbon dioxide, water vapor, or oxygen present in the endothermic gas. Normally, the gas to air ratio entering an endothermic gas generator is established by a device or series of devices that are generically referred to as a fixed air/gas ratio control system. Typically, the fixed air/gas ratio control system includes orifices on both the gas and air input lines. Because one or both of the orifices may be adjustable, the operator can set the ratio to a desired operating point. Typically, the ratio is automatically maintained by equipping the hydrocarbon gas line with a mechanical ratio control regulator which has a pressure impulse line connected to the air line. Changes in air flow are sensed by the mechanical ratio control regulator which makes a corresponding flow change to the hydrocarbon gas. Unfortunately, these mechanical ratio control systems do not maintain the hydrocarbon gas to air ratio perfectly over the turndown range of the generator.

To compensate for errors in these mechanical fixed air/gas ratio control systems, one or more of the residual species gases can be measured in the product endothermic gas stream and compared to a set point value. Depending on that comparison, the endothermic gas can be made richer by increasing the hydrocarbon gas to air ratio or can be made leaner by decreasing the hydrocarbon gas to air ratio. In prior art systems, this change in gas to air ratio is typically performed by manual adjustment of the fixed air/gas ratio control system or automatically by use of a control system which measures the residual species gas in the product endothermic gas and automatically makes an output adjustment to a trim valve on the gas or air lines. One such automatic system marketed and sold by Marathon Monitors, Inc. ("MMI") utilizes an oxygen probe which is approximately 24" long which is inserted into the top of a reaction retort downwardly so that the probe tip resides at a point just above the catalyst. The sensor, in that position, is subjected to very hot (1800°–2200° F.) endothermic gas. In the MMI system, the oxygen sensor produces a voltage output which is an input to the MMI CarbPro controller which computes the error in gas composition from a desired set point and sends output signals to trim valves that vary the gas to air ratio.

Automatic control systems are known in the prior art. However, all such systems suffer deficiencies. For example, one known endothermic gas control system measures the carbon dioxide content of the product endothermic gas with infrared gas analyzers. Although these systems are normally quite accurate, they have the disadvantage of requiring high maintenance, high analyzer costs, complicated gas sampling systems, and frequent calibration with certified composition calibration gases. Furthermore, when connected to several endothermic gas generators, the $CO_2$ infrared control system provides slow control, since the sample stream must be switched from generator to generator. Normally, 1–2 minutes are required to sample and analyze the gas stream of each generator. For example, if a single infrared control system is connected to a bank of six endothermic gas generators, the control system can only analyze and make control corrections to a single generator every 6–12 minutes.

Another known system measures water vapor in the product endothermic gas and involves a manual adjustment to the fixed air/gas ratio control system depending on the measurement. Also known in the art are more complex automatic water vapor measurement systems. A significant disadvantage of manual water vapor measurement systems is that the composition of the product endothermic gas is highly dependent upon operator technique and skill. Automatic water vapor measurement systems have many disadvantages also. For example, they require sample systems and have the same disadvantages as $CO_2$ infrared systems, but are considerably more difficult to calibrate. As a result, most commercial automatic control systems utilize oxygen probes to sense residual oxygen in the product endothermic gas stream.

Oxygen probes provide a continuous DC output voltage which is easily coupled to a single loop controller such as a Barber Colman model 560 which is then in turn connected to a trim valve to correct the inlet gas/air ratio. However, because the typical oxygen sensor must be very long to reach into the product endothermic gas stream and because the sensor is subjected to and must withstand the high temperatures associated with the product gas, these sensors are typically very expensive. For example, the MMI system utilizes an expensive (around $1500 each) long type oxygen probe which is essentially the same type used to insert through a furnace wall for the in-situ measurement of oxygen in a furnace atmosphere.

Typically, the known automatic control systems use only a single oxygen probe per generator even though the generator may have multiple retorts. As is known to those skilled in the art, there may be flow variations from one retort to another in an endothermic gas generator equipped with multiple retorts. These flow variations can affect the composition of the product endothermic gas. It is well known that the endothermic gas never reaches the operating temperature of the heating chamber that the retorts are located in due to the high velocity of the gases through the retorts. The higher the flow rate through the retort, the lower the peak temperature achieved by the endothermic gas in the retort. Since the equilibrium relationship between all of the molecular species in the endothermic gas is affected by the temperature, the composition of the gas fluctuates with flow rate.

If a control system only has a single $O_2$ probe, such as on the MMI system, only the oxygen content in one retort is measured. This may not be representative of the total output of a multiple retort generator if flow variation between retorts is different. The high cost and complexity of using multiple long type oxygen probes and controllers makes using a single long type oxygen probe per retort prohibitively expensive. The cost problem of long type oxygen probes is further exacerbated by the greatly reduced sensor life experienced in the endothermic gas generator application because of the temperature of the product endothermic gas.

The high cost of the long type oxygen probes has spawned development of endothermic generator control systems that utilize low cost (around $30 each) automotive type oxygen sensors. One such system is described in U.S. Pat. No. 5,211,820 ("the '820 Patent") and another in U.S. Pat. No. 4,060,807 ("the '807 Patent"). The automotive type sensors were originally developed for use with onboard computers on automobiles to control the engine fuel/air mixture for optimum performance and reduced emissions. They were designed to sense oxygen in atmospheres that are in the range of 400°–1500° F. and they operate best in the range of 800°–1200° F. At temperatures below 800° F., the probe impedance increases dramatically and is subject to polarization which causes incorrect voltage readings unless voltage measuring equipment with extremely high input impedances is used. At temperatures above 1500° F., the probe life will be shortened, because the main body of the probe is made from plain carbon steel and cannot withstand the harsh environment of uncooled endothermic product gas. For these reasons, the automotive type sensor has been difficult to use.

Another serious problem with the automotive oxygen sensor is that the sensing probe is very short in length (less than 1 inch). This limitation is overcome in the '807 Patent by the use of a separate heated sample chamber that allows the oxygen sensor tip to be exposed to a sample of endothermic gas. The chamber is heated to around 1400° F. with an electric heating element. Although the '807 Patent discloses a way to use automotive type sensor in an endothermic gas generator application, it has many drawbacks which are described in detail in the '820 Patent.

As described in the '820 Patent, the most serious drawback is soot formation within the sensor tip which leads to drastically shortened sensor life—as short as two weeks. Sooting is discussed in the '807 Patent and is addressed by removal of the probe sensor and cleaning of the sensor housing tube with a brush. Obviously, the frequent removal and cleaning of the sensor is time consuming and expensive.

Soot formation is a known problem in the art and typically occurs within the temperature ranges of 900°–1500° F., because of equilibrium composition shifts. The '820 Patent attempts to overcome this problem by operating at less than 900° F. To do that, however, the system requires significant additional hardware, including conduit to pass the sample product gas to a dedicated sample chamber where the gas is reheated to appropriate levels for the automotive type sensor. However, the sensor in '820 patent also becomes fouled with soot. The '820 Patent overcomes this drawback by burning the soot out of the sensor tip by applying a DC voltage to the sensor electrolyte. The MMI oxygen probe also becomes fouled with soot and is equipped with an internal air burnout system. of course during burnout, the sensor does not produce a useful signal. Thus, another disadvantage of existing systems that utilize oxygen sensors is that special sensor burnouts or cleaning must be performed periodically with an associated loss of the use of the sensor. Both the '807 Patent and the '820 Patent utilize a sample stream directed into a separate sampling chamber and therefore have an advantage over the MMI system of sampling the total generated endothermic product gas rather than the composition of a single retort. However, the '807 and '820 patent systems both require a separate sampling chamber to accommodate the physical limitations of the automotive probe sensor length and incorporate a means of heating the sensors so that adequate sensor output is achieved.

A further difficulty in using oxygen sensors in endothermic gas generation is that fresh reference air must be supplied to the sensor. As is known in the art, all oxygen sensors that utilize a solid zirconia or titania electrolyte are subject to depletion of the reference air caused by transport of oxygen anions through the electrolyte. On most commercial long type oxygen probes, such as the MMI probe, a means of supplying fresh reference air to the sensor is provided. However, automotive oxygen probes typically do not have a similar capability. Instead, automotive probes typically limit the flow of fresh reference air to the sensor to prevent excessive cooling of the sensor tip. Excessive tip cooling is a problem that is recognized by both Poor et al. in the '820 Patent and by Bienkowski in U.S. Pat. No. 4,147,513 ("the '513 Patent"). As described above, limiting the flow of reference air can generate sensor errors.

One object of the present invention is to provide an oxygen sensing system which utilizes low cost, automotive type oxygen sensors without the need for special sampling chambers, sample systems, or means for heating the sample tip.

Another object of the present invention is to provide an economical method of sampling the oxygen content of each retort of an endothermic gas generator using automotive oxygen sensors and combining the output signals in such a way as to provide a single output signal that is representative of the average oxygen composition of the generator.

Yet another object of the present invention is to provide a control system utilizing automotive oxygen probes that does not require a burnout cycle specifically intended to clean soot from the oxygen sensor.

Still another object of the invention is to provide a method of using an automotive oxygen probe which incorporates a reliable means of assuring fresh reference air to the sensor without the need for special reference air pumps, plumbing, or preheating.

These and other objects and advantages of the present invention will become apparent to those skilled in the art from reading the detailed description of a preferred embodiment in conjunction with the drawings and appended claims.

DETAILED DESCRIPTION OF A PREFERRED EMBODIMENT

The following is a detailed description of the best mode embodiment of the present invention. The single embodiment described herein is not intended to define the invention. To the contrary, the present invention includes all embodiments and equivalents as may fall with the scope of the appended claims.

Figure 1:
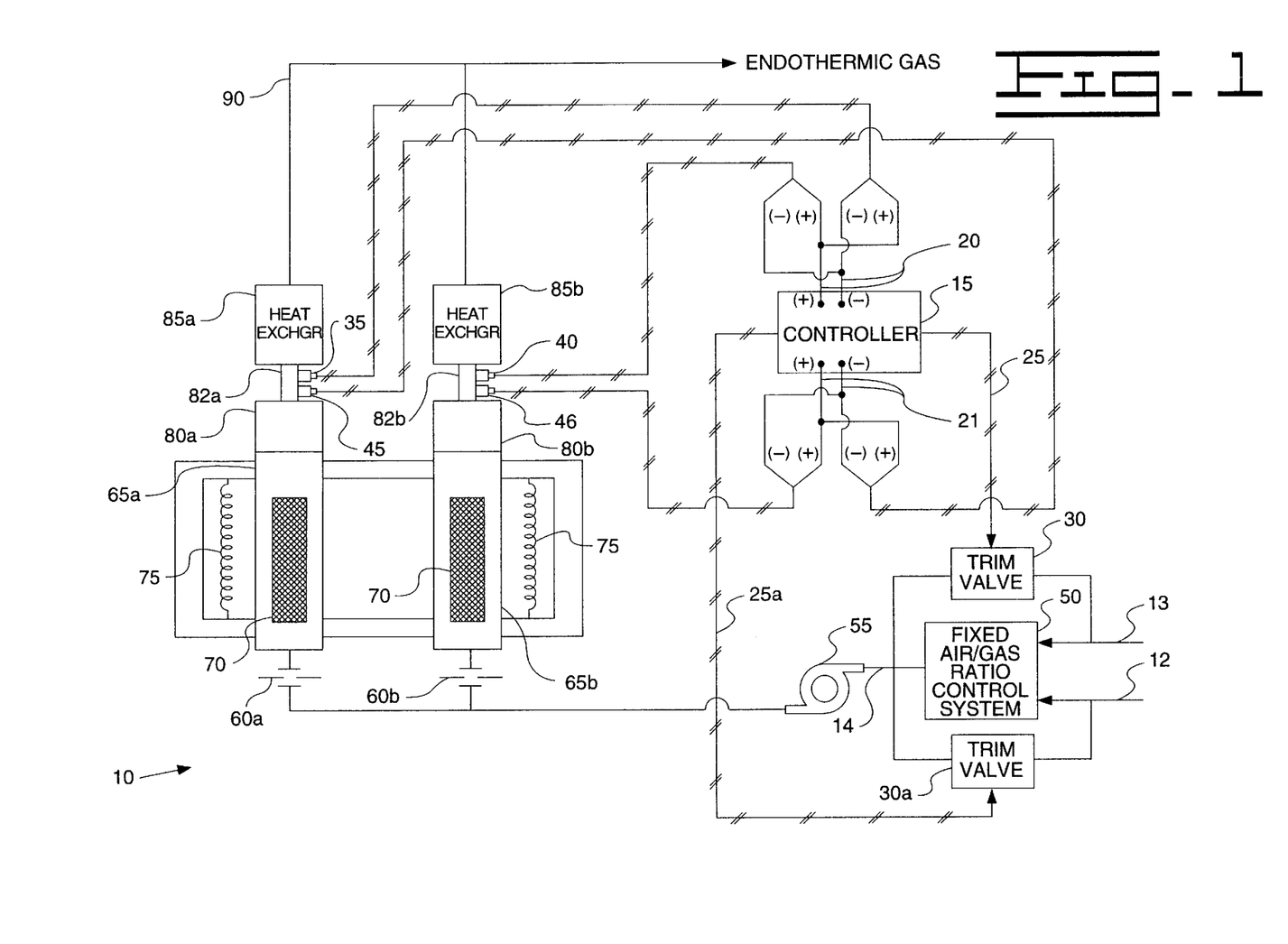
FIG. 1 is a schematic diagram of a preferred embodiment of an endothermic gas generator of the present invention.

Referring first to FIG. 1, a schematic block diagram of a preferred embodiment of a control system of the present invention is shown used on an endothermic gas generator 10. Although the control system of the present invention is shown in conjunction with an endothermic gas generator 10, it can be used on many other types of gas generators. For example, other applications where the present invention would be particularly applicable are generators that react hydrocarbon gas and air at elevated temperatures.

As is conventionally known with respect to the operation of such a generator 10, one commercial way to make endothermic gas is to crack the chemical bonds in a gas mixture of approximately 2.5 parts air to 1 part of hydrocarbon gas. Although the present invention employs hydrocarbon gas, other methods for generating endothermic gas are known and may be used in connection with the present invention.

The relative composition of hydrocarbon gas to air is known in the art as the "richness" of the product endothermic gas. Thus, one skilled in the art would refer to an endothermic gas generated with a higher hydrocarbon gas to air ratio than another gas as being richer. Likewise, one skilled in the art would refer to an endothermic gas generated with a lesser hydrocarbon gas to air ratio than another gas as being leaner. It is important for the endothermic gas generator 10 to produce gas with a known and controllable richness, especially where the product endothermic gas will be used in heat treating applications. To produce an endothermic gas with a desired, consistent richness it is necessary to control the mixture of the gas and air entering the gas generator 10. In a preferred embodiment of the present invention, a known fixed air/gas ratio control system 50 is used to set the ratio of hydrocarbon gas to air. These systems typically use orifices to control the gas and air input lines. One or both of the orifices may be adjustable, thus permitting the operator to set the air/gas ratio to a desired operating point and thereafter make minor adjustments to that ratio in an attempt to keep the product endothermic gas at the desired richness.

The ratio control system 50 sometimes includes mechanical ratio control regulator (not shown) installed on the hydrocarbon gas line 13 which has a pressure impulse line connected to the air line 12. Mechanical ratio control regulators are known in the art and permit the ratio control system to automatically modify the hydrocarbon gas 13 input for sensed variations in air flow rate in the air flow input 12. Unfortunately, these mechanical ratio control systems do not maintain the hydrocarbon gas to air ratio perfectly over the entire turndown range of the generator. To compensate for errors in the fixed ratio control system 50, a trim valve 30 may be added. The trim valve 30 can then be used to further modify the air/gas input ratio to better ensure a consistent product gas. In some systems, it may be desirable to have a second trim valve 30a.

In a preferred embodiment of the present invention, control of the trim valve 30 is performed automatically through control signals which are output from the controller 15 over connector 25. Thus, the mixture of the air and hydrocarbon gas entering the generator 10 is controlled automatically. Included in the gas generator 10 is a gas generator control system which preferably includes a controller 15, a first and second oxygen sensor 35, 40 and a first and second temperature sensor 45, 46. The controller 15 receives sensor inputs 20, 21 and responsively produces a control output signal 25 to a trim valve 30. In a preferred embodiment, the generator control system includes a single trim valve 30. However, as shown in FIG. 1, the system may also include a second trim valve 30a connected from the air input 12 to the output 14 of the air/gas ratio control system 50. Although a preferred embodiment of the present invention controls the trim valve 30 automatically, an alternative embodiment envisions manual operation of the trim valve 30. In a manual control embodiment of the invention, the sensor inputs 20, 21 would be received by a display device (not shown). An operator would then read the display and adjust the trim valve(s) 30, (30a) manually to adjust the input gas.

Many different commercially available controllers 15 can be used in connection with the present invention. In a preferred embodiment, the controller 15 is a commercially available controller, Model 963D, manufactured by Eurotherm Co. However, one skilled in the art will recognize that other controllers could readily and easily be used without deviating from the scope of the present invention as defined by the appended claims. The controller 15 is connected to several sensors, which in the preferred embodiment include a first and second oxygen sensor 35, 40 and a first and second temperature sensor 45, 46. Although the preferred embodiment of FIG. 1 illustrates an endothermic gas generator 10 having two oxygen sensors, other embodiments could have more and fewer than that number and still fall within the scope of the present invention as defined by the appended claims. Likewise, although the preferred embodiment of FIG. 1 illustrates an endothermic gas generator 10 having two temperature sensors, other embodiments could have more and fewer than that number and still fall within the scope of the present invention as defined by the appended claims.

The gas generator 10 includes a gas/air ratio control system 50 that mixes the air 12 and the hydrocarbon gas 13 in a fixed ratio. As noted above, the gas produced by the generator will generally have the correct richness if the input has a ratio of 2.5 parts hydrocarbon gas to 1 part air. Even though the ratio control system 50 is initially set to that ratio, there may be other factors that will affect the product gas richness. Those factors include, among others, flow rate of the endothermic gas, changes in the composition of the input hydrocarbon gas, and failure or degraded performance of generator components. Because these and other factors can influence gas richness, the trim valve 30 is included to modify the input ratio slightly to account for changes in endothermic gas richness from these and other causes. The gas/air ratio controller 50 is a well known component in the art. As noted above, the ratio of the gas/air mixture entering the pump 55 can be modified by manipulating the trim valve 30, to account for system variations or variations in the input gas composition. In this way the gas generator control system can maintain an output of product endothermic gas with a consistent richness.

In a preferred embodiment the controller 15 evaluates the oxygen content of the product endothermic gas by reading the signals produced by the oxygen sensors 35, 40 on input lines 20 and the temperature sensors 45, 46 on lines 21 and thereafter calculates the richness of the product endothermic gas. As is known to those skilled in the art, an endothermic generator that is operated under varying output flow conditions will produce varying oxygen sensor outputs in response to the flow changes. Thus, sensor output changes could be a result of flow changes in addition to changes in the composition of the reaction gas, changes in air composition, or other fixed reaction ratio system errors. Thus, in order to accurately measure product gas composition the controller 15 must correct for flow rate. Modern process controllers typically permit the process designer to supply multiple inputs and correct the process signal based upon calculations using the various input signals. One such Controller is a Eurotherm Model 963D. In a preferred embodiment of the invention of the present application, the controller 15 corrects for product gas flow using the first and second temperature sensors 45, 46. In a preferred embodiment, the first and second temperature sensors 45, 46 include thermocouples. However, other temperature sensing devices could be used. As is known to those skilled in the art, there is a direct relationship between the temperature of the gas exiting a gas generator retort and the flow of the gas through that retort. Thus, the controller 15 is able to calculate the gas flow through a retort from the measured temperature. Although the preferred embodiment uses temperature sensors to determine gas flow through the retorts, other methods of sensing flow could be used without deviating from the scope of the present invention as defined by the appended claims. For example, a pressure sensor might be used. In addition, in a particular embodiment, flow rate through the retort might not be an important factor and the temperature sensors could then be eliminated.

Figure 2:
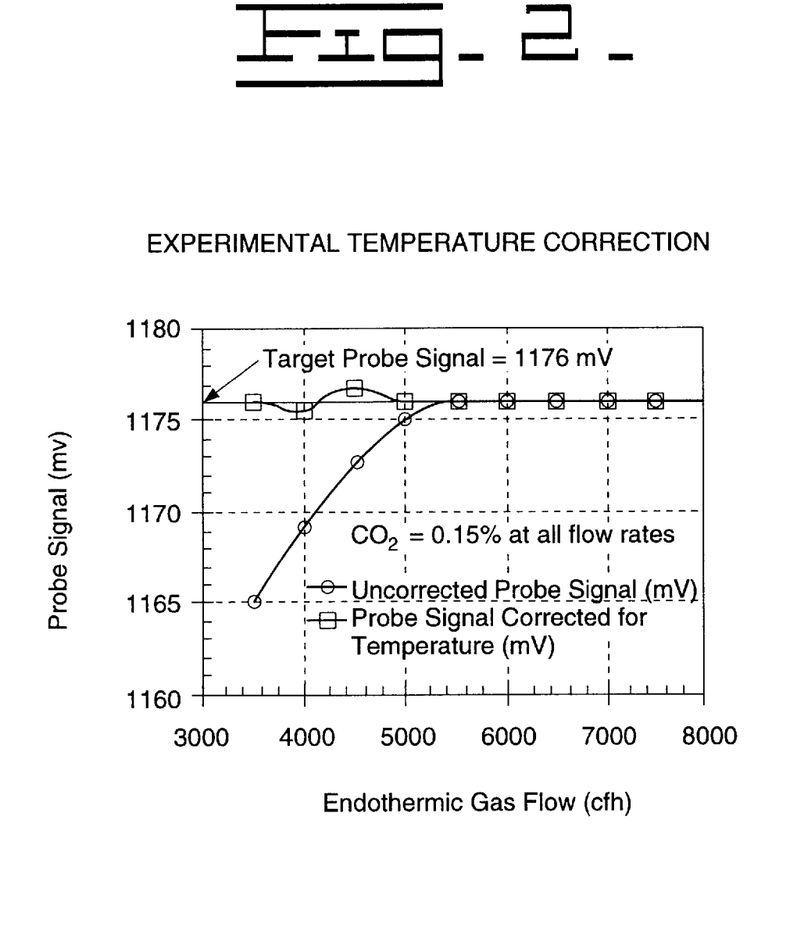
FIG. 2 shows a graph of a temperature correction used in a preferred embodiment of the generator control of the present invention.

FIG. 2 shows the variation in the uncorrected probe voltage signal for a endothermic gas generator operated at a constant 0.15% $CO_2$ level as a function of flow rate. It can be seen that the probe signal remains constant as the flow is reduced from a maximum flow rate of 7500 cubic foot per hour (cfh) to about 5500 cfh. From 5500 cfh to the minimum flow rate of 3500 cfh, the probe signal drops approximately 11 mv. By using the temperature of the endothermic gas near the oxygen sensor tip as a flow input signal, the oxygen sensor process value is corrected in the flow range of 3500–5500 cfh to within ½ mv of the target value of 1176 mv. The controller 15 uses the relationship shown in the graph of FIG. 2 to correct the oxygen sensor output for flow rate. The chart of FIG. 2 is for the specific generator used in a preferred embodiment. However, one skilled in the art could readily and easily develop the same chart for other generators, or the same generator with different components, for example, different heat exchangers. In a preferred embodiment, the correction is expressed in the controller as a quadratic equation determined by a quadratic fit from the sampled points on the graph. The quadratic equation for the particular embodiment shown is:

$$PV_{corr} = 328.08 - 1.2353T + 0.0011567T^2$$

For 425° C. < T < 500° C.

$PV_{corr}$ is the oxygen sensor voltage corrected for product gas flow rate. With the sensor readings 20, 21, the controller 15 compares a corrected sensor voltage with a desired sensor setpoint voltage. If there is a variation between the desired and corrected voltages, the controller 15 produces an output signal 25 to the trim valve 30 to change the composition of the gas that is input to the gas pump 55. In this way the controller will change the input mixture to better ensure consistent richness of the endothermic gas at the generator 10 output. In some embodiments, for example where the input gas and air are under sufficient pressure, the gas pump 55 may be unnecessary.

The gas pump 55 is preferably connected to a first and second distribution orifice 60a, 60b which help ensure that the incoming gas mixture is distributed evenly into the first and second retort 65a, 65b so that the flow rate through each retort is roughly the same. In the preferred embodiment, the gas generator 10 includes two retorts 65a, 65b although a single retort or more than two retorts could be used without deviating from the scope of the present invention as defined by the appended claims. As is known to those skilled in the art, each retort 65a, 65b includes a catalyst 70 which promotes the cracking of the incoming gas. The generator 10 also includes a heating means 75 that heats the incoming gas to permit the cracking to occur.

The hot endothermic gas then enters first heat exchangers 80a, 80b which rapidly cool the product gas to around 1200° F. The gas passes from the first heat exchangers 80a, 80b to second heat exchangers 85a, 85a through passages 82a, 82b. As shown in FIG. 1, the first and second oxygen sensors 35, 40 and the first and second temperature sensors 45, 46 are preferably installed in the passages 82a, 82b. The cooled endothermic gas exits the second heat exchangers 85a, 85a and proceeds to an output of the generator 10. Although, a preferred embodiment of the present invention includes two heat exchangers 80, 85 per retort, other gas generator systems may employ a single heat exchanger and nevertheless fall within the scope of the present invention as defined by the appended claims.

As noted above, automotive type oxygen sensors are more accurate when the gas to be measured is within a temperature range of about 800°–1500° F. The temperature of the product endothermic gas directly above the catalyst bed is typically in the range of about 1800°–2200° F. and therefore must be cooled to the appropriate measurement range.

In previous generator controls using automotive type oxygen sensors, the product endothermic gas produces heavy soot. The inventors of the present application have discovered that sooting is a function of cooling rate of the product endothermic gas. Thus, the amount of sooting can be controlled by controlling the cooling rate at which the temperature drops from the upper range of 1800°–2200° F. to a desired measurement temperature within the measurement range of 800°–1500° F. The inventors of the present invention have determined that sooting can be minimized when the cooling rate of the gas is at least 4000 F. deg/sec. In a preferred embodiment, it is therefore important to place the automotive type oxygen sensor in the product endothermic gas stream at a point where the temperature is in the range of about 800°–1500° F. after having been cooled at a rate of at least 4000 F. deg/sec. Thus, proper placement of the oxygen sensors 35, 40 is important to proper functioning of the present invention. As noted above, those skilled in the art recognize that sooting can severely degrade the performance of an oxygen sensor. By strategically placing the automotive type oxygen sensors as noted above, sooting induced sensor failure is avoided.

Figure 4:
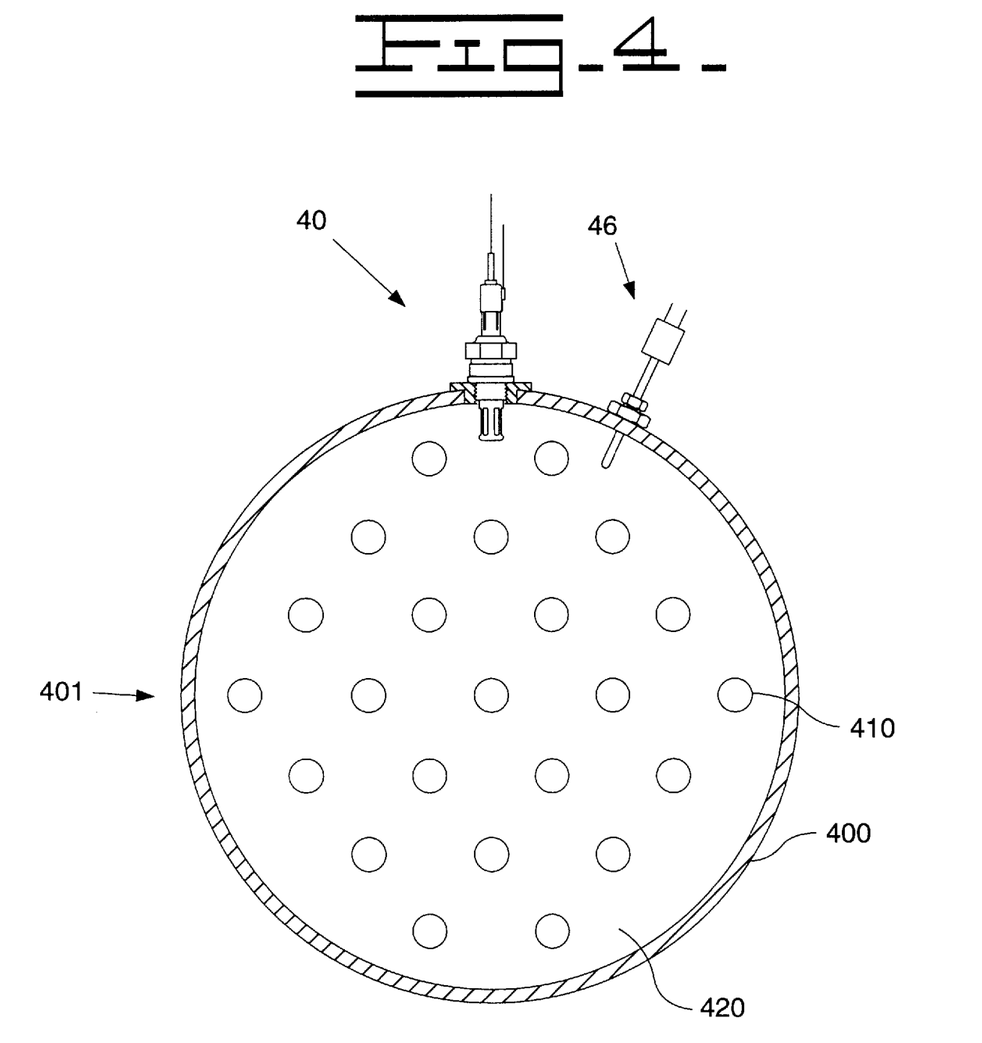
FIG. 4 shows a cross section of a shell and tube heat exchanger with an oxygen sensor and thermocoupler.

In the generator configuration of FIG. 1, proper placement of the oxygen sensors 35, 40 (i.e. so that the sensed product gas meets the above requirements) is located in the passages 82a, 82b. However, in other generator configurations the proper placement of the oxygen sensors 35, 40 may be a different physical location. For example, one known type of heat exchanger is commonly referred to as a shell and tube heat exchanger 401. FIG. 4 shows a representative cross section of a shell and tube heat exchanger taken at the point of proper placement of the oxygen sensor 40. The cross section shows the heat exchanger shell 400 encompassing the shell region 410 where the product endothermic gas travels. Also shown in the cross section are the water cooled tubes 410 inside the shell region 420.

As shown in FIG. 1, the first and second oxygen sensor 35, 40 are connected in parallel. Likewise, the first and second temperature sensors 45, 46 are connected in parallel. As is known by those skilled in the art, by connecting the sensors in parallel the voltage input to the respective inputs on the controller 15 represent and average of the voltage across each individual sensor. Thus, because the sensors are connected in parallel, the controller does not have to perform the averaging and the number of controller input channels can be reduced.

Figure 3:
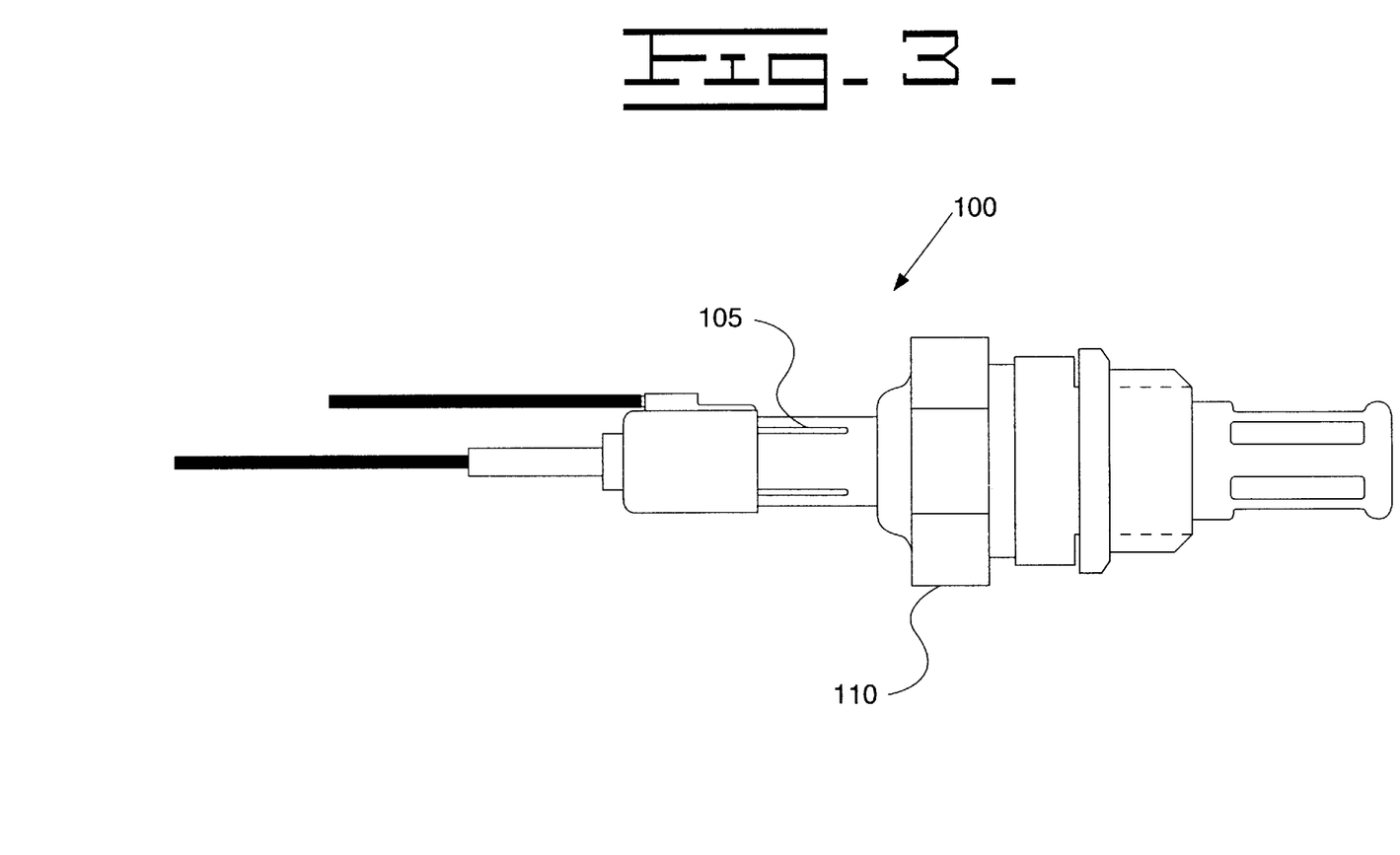
FIG. 3 shows a typical automotive type oxygen sensor used in connection with an embodiment of the present invention.

Referring now to FIG. 3, a preferred embodiment of the automotive type oxygen sensor 100 used in connection with the present invention is shown. The automotive type oxygen sensor 100 is preferably used as first and second oxygen sensors 35, 40 shown in FIG. 1. In a preferred embodiment the automotive type sensor is available from the General Motors Company as Part No. 25106169. An alternative oxygen sensor is a single wire sensor also manufactured by General Motors Company as Part No. 25105107. However, other models of automotive type oxygen sensors could also be used.

As shown in FIG. 3, the inventors of the present invention have modified the automotive type sensor 100 by machining reference air openings 105 in the body 110 of the sensor 100. In a preferred embodiment the reference air openings 105 are in the form of slots. These reference air openings 105 are desirable because the sensor 100 as manufactured for automotive applications does not permit sufficient reference air flow to the reference side of the sensor. The reference air openings 105 in the sensor 100 create greater reference air access to the reference side of the sensor and thereby prevent the sensor from providing erroneous readings because of oxygen anion depletion. Although the embodiment of FIG. 3 shows slots 105 machined into the body of the sensor 100, holes or other shapes could be cut from the body 110 without deviating from the scope of the present invention. The minimum slot area on the body should be 0.001 square inches to permit sufficient reference air circulation on the reference side of the sensor. The maximum size and number of reference air openings is only limited by the structure of the body 105. In a preferred embodiment of the present invention, the slot area on the sensor body is about 0.03 square inches.

We claim:

1. An automatic control for a gas generator, said gas generator including a mixture control connected to input gases, a trim valve, a retort, a catalyst, heating means and a first and second heat exchanger, said automatic control including:

a controller;

an automotive type oxygen sensor connected downstream of said first heat exchanger, said sensor outputting a signal responsive to an oxygen content of gas passing from said first heat exchanger, wherein said controller receives said signal and outputs a control signal;

a trim valve responsive to an output signal produced by said controller;

a second heat exchanger; and wherein said oxygen sensor is installed between said first and second heat exchanger.

2. The apparatus according to claim 1, including:

a temperature sensor having an output responsive to a sensed temperature, said temperature sensor being installed downstream of said first heat exchanger; and wherein said controller receives said temperature sensor output and calculates a flow rate compensation factor based on said output.

3. The apparatus according to claim 2, wherein said automotive oxygen type sensor includes reference air openings in a body of said sensor.

4. The apparatus according to claim 1, wherein said automotive oxygen type sensor includes reference air openings in a body of said sensor.

5. An automatic control for a gas generator, said gas generator including a mixture control connected to input gases, a trim valve, a retort, a catalyst, heating means and a first and second heat exchanger, said automatic control including:

a controller;

an automotive type oxygen sensor connected downstream of said first heat exchanger, said sensor outputting a signal responsive to an oxygen content of gas passing from said first heat exchanger, wherein said controller receives said signal and outputs a control signal;

a trim valve responsive to an output signal produced by said controller;

a second heat exchanger;

a passage connecting said first and second heat exchanger; and wherein said oxygen sensor is installed in said passage.

6. The apparatus according to claim 5, including:

a temperature sensor having an output responsive to a sensed temperature, said temperature sensor being installed downstream of said first heat exchanger; and wherein said controller receives said temperature sensor output and calculates a flow rate compensation factor based on said output.

7. An automatic control for a gas generator, said gas generator including a mixture control connected to input gases, a trim valve, a retort, a catalyst, heating means and a first heat exchanger, said automatic control including:

an oxygen sensor producing an output responsive to an oxygen content of a product gas stream, wherein said oxygen sensor is installed in said gas generator in the product gas stream at a point downstream of said catalyst where said product gas has been cooled to a measurement temperature at a rate of at least 4000 F. deg/sec; and a controller receiving said oxygen sensor output and producing a trim valve control signal.

8. The apparatus according to claim 7, including:

a trim valve associated with said mixture control, wherein said trim valve is responsive to said trim valve control signal.

9. The apparatus according to claim 7, including:

a temperature sensor having an output indicative of a sensed temperature, wherein said temperature sensor senses the temperature of the product gas downstream from said catalyst; and wherein said controller produces an oxygen measurement compensation responsive to said temperature sensor output.

10. The apparatus according to claim 7, wherein said automotive oxygen type sensor includes reference air openings in a body of said sensor.

11. The apparatus according to claim 9, wherein said automotive oxygen type sensor includes reference air openings in a body of said sensor.

12. The apparatus according to claim 7, wherein said measurement temperature is less than 1500° F.

13. The apparatus according to claim 9, wherein said measurement temperature is less than 1500° F.

14. The apparatus according to claim 11, wherein said measurement temperature is less than 1500° F.

15. The apparatus of claim 7, wherein:

said heat exchanger includes a shell and tube heat exchanger having a shell region and a tube region, said product gas passing through the shell region and cooling medium passing through the tube region; and said oxygen sensor is installed through the shell of the heat exchanger into the product endothermic stream.

\* \* \* \* \*